3,132,164
HARD ESTER WAXES AND PROCESS FOR
THEIR MANUFACTURE
Josef Kaupp and Albert Thalhofer, Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed July 28, 1959, Ser. No. 829,984
Claims priority, application Germany July 31, 1958
8 Claims. (Cl. 260—410.5)

The present invention relates to hard ester waxes and to a process for their manufacture.

In the processes that have hitherto been applied for the manufacture of synthetic ester waxes, monohydric or polyhydric alcohols are used as hydroxyl components. It is especially the use of polyhydric alcohols that enables hard waxes to be obtained by esterifying organic acids containing more than 12 carbon atoms, preferably more than 18 carbon atoms.

It has already been proposed to prepare very valuable waxes by esterification of fatty acids of high molecular weight with aromatic dimethylol compounds, such as dimethylol benzene, dimethylol naphthalene etc., which are much superior to the acids used with starting material as regard to their oil binding properties and their capacity for forming pastes.

It has also been proposed to prepare very hard ester waxes by reacting organic acids containing more than 18 carbon atoms with oxalkylated, aromatic polyols, such as resorcin, dihydroxy-diphenylpropane, tetrahydroxy-naphthalene etc. alone or in admixture with aliphatic glycols.

Now, we have found that waxes having an extraordinary hardness very good gloss-producing properties and an excellent capacity for forming pastes are obtained by reacting organic fatty acids and wax acids, i.e., mainly monocarboxylic acids having at least 12, preferably more than 18 carbon atoms, with compounds of the formula

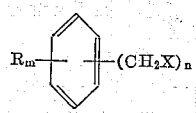

wherein X stands for hydrogen chlorine, hydroxyl or a hydroxyl group reacted with an alkylene oxide containing 2 to 4 carbon atoms R stands for an alkyl radical containing up to 4 carbon atoms, or the group —CH$_2$X, and $m$ and $n$ are integers, the sum of which is 6 and wherein at least two radicals X are radicals other than hydrogen. Such compounds which can also be used in admixture with other polyhydric alcohols are for example, polychlormethylbenzenes or polyhydroxy-hexaalkylbenzenes, such as dimethylol-tetramethylbenzene, trimethylol-trimethylbenzene tetramethylol-dimethylbenzene and hexamethylolbenzene. These hydroxy-hexaalkylbenzenes which are accessible by a more or less extensive chlorination of hexamethylbenzene or by an exhaustive chlormethylation of alkylbenzenes, such as toluene ethylbenzene, cumene, cymene, xylene, di-isopropylbenzene, mesitylene, benzyl alcohol etc. and by subsequent saponification—or which can, if necessary be produced in the course of the esterification—can also wholly or partially be oxalkylated with ethylene oxide, propylene oxide and/or butylene oxide. In the course of this oxalkylation there should suitably not be added more than 5 mols of alkylene oxide per hydroxyl group. Also, these oxalkylation products or mixtures thereof with aliphatic polyhydric alcohols, preferably glycols can be used with special advantage as hydroxyl components for the synthetic preparation of waxes. Examples for chlorhexamethylbenzenes, there are mentioned dichlormethyl-tetramethylbenzene, trichlormethyl-trimethylbenzene tetrachlormethyl-dimethylbenzene and hexachlormethylbenzene. As examples for the oxalkylation products formed by the addition of ethylene oxide, propylene oxide and/or butylene oxide, there are mentioned tetrakis-O($\beta$-hydroxyethyl-oxymethyl)-dimethylbenzene (an addition product of 4 mols of ethylene oxide to dimethyltetramethylolbenzene) or tris-O(hydroxybutyloxymethyl)-trimethylbenzene (an addition product of 3 mols of butylene oxide to trimethyl- trimethylolbenzene).

When there are still added aliphatic polyols to the polyol compounds used according to the invention, the latter shall advantageously be present in a quantity amounting to at least 10 mol percent preferably at least 50 mol percent of the alcohol component. As aliphatic polyols there are mentioned, for example, ethylene glycol, propylene glycol, butylene glycol, glycerol, pentaerythritol, trimethylolpropane or mixtures of such compounds. The reaction according to the invention should, however, only be carried to such an extent that there is still maintained a certain acid value amounting, in general, to at least 17.

It is however not absolutely necessary first to prepare from the chlorinated methylbenzenes the respective hydroxy compounds by saponification and then to esterify said compounds. The chlormethylbenzenes can on the contrary, be reacted with organic fatty acids and wax acids in the presence of media binding hydrogen chloride, such as inorganic metal hydroxides, for example lithium hydroxide, sodium hydroxide, magnesium hydroxide or calcium hydroxide. In the course of this reaction, the respective chlormethylbenzenes can be melted with the carboxylic acids used and the calculated amount of aqueous alkali lye be added, while stirring rapidly. In certain cases it may be advantageous not to exchange the chlorine completely. This modification only comes into consideration, of course, when there are exchanged at least two chlorine atoms per molecule. Such an incomplete exchange can, for example, be attained by using less than the calculated amount of alkali lye (for example 90%). The water is suitably discharged continuously and the reaction product freed from the sodium chloride having formed by filtration at the end of the reaction. Instead of an aqueous alkali lye there may also be added solid alkalihydroxide powder in the course of the reaction. The respective acetates, for example the tetraacetate of tetramethylol-dimethylbenzene, can also be reacted with fatty acids and wax acids in a manner similar to that when reacting the chlormethylbenzenes. The respective compounds can, of course, also be obtained by the direct reaction of chlorhexamethylbenzene with the alkali metal salts of fatty acids and wax acids, such as sodium stearate, potassium behenate, sodium montanate, etc.

As organic acids there are suitably used those having more than 18 carbon atoms, for example behenic acid, arachidic acid and preferably the wax acids obtained by chemical bleaching of the crude montan wax and/or by the chromic acid oxidation of air oxidation products of paraffins, or the derivatives thereof, such as acid halides, acid anhydrides, etc. However, for special purposes, for example for lubricating waxes or soft waxes, there may be used other acids, such as lauric acid, oleic acid, stearic acid, etc.

The molar ratio of the reactants used may vary within wide limits without the properties of the final products being substantially impaired. For example, 0.7–1.5 equivalents of hydroxyl groups or chlormethyl groups may be reacted with 1 equivalent of the carboxyl groups employed. Moreover, at the end of the esterification, part of the carboxyl groups may be converted into the soaps of elements of groups I and II of the periodic table, for example by neutralization with lithium hydroxide, calcium hydroxide, magnesium oxide, magnesium hydroxide, or magnesium acetate or zinc hydroxide.

The addition of soaps of metals of groups II, III and IV of the periodic table, such as titanium stearate, aluminum palmitate, zinc stearate, beryllium stearate, barium behenate or the corresponding montanates, may further improve the properties. When part of the carboxyl groups that have not been esterified is neutralized, they are preferably converted into calcium soaps, possibly—as an additional measure—still into soaps of other metals. The esterification may take place in a melt or in a solvent in known manner, while the solvent may at the same time serve as entraining agent for the reaction water having formed. In order to accelerate the esterification, the usual catalysts may be used, such as toluene sulfonic acid, sulfuric acid.

It is advantageous to work under a blanket of protective gases, such as nitrogen or carbon dioxide.

The waxes prepared according to the invention have a light yellow color and possesses, even when not yet converted into calcium soaps, a hardness surpassing that of the known natural waxes, such as carnauba wax, candelilla wax or sugar cane wax. Due to their capability of being wholly or partially emulsified both with ionic and non-ionic emulsifiers, they are suitable above all for being employed in the wax emulsions which are used to an ever increasing extent at present and can often be used as bright drying polish emulsions on account of their excellent gloss. Their extraordinary capacity for forming pastes and their excellent oil binding property, combined with a high retention of solvents, render them especially suitable for use in metal, floor and leather polishes.

The waxes prepared according to the invention may, of course, also be used as additions to other waxes, preferably those prepared from refined montan wax, for example by esterification, thus considerably improving the hardness and gloss of such waxes.

The following examples serve to illustrate the invention but they are not intended to limit it thereto, the parts being by weight:

Example 1

400 parts of a montan wax acid (acid value 137), obtained by bleaching crude montan wax with chromic acid are heated in an agitator vessel under a blanket of nitrogen to 100°–150° C. with 71 parts of tris-O($\beta$-hydroxyethyl-oxymethyl)-trimethylbenzene, with the addition of 0.8 part of sulfuric acid of 20% strength, until the acid value has decreased to 20. A light brown wax is obtained possessing a good capacity for forming pastes and a good compatibility with paraffins; saponification value 121, flow point/drop point (according to Ubbelohde) 78/79° C. The hardness of flow of this wax (720 kg./cm.$^2$) is substantially higher than that of a comparative wax prepared from ethylene glycol and montanic acid of the same acid value (only about 525 kg./cm.$^2$).

Example 2

500 parts of a mixture oxidized with chromic acid of which 50% by weight consists of deresinified crude montan wax and 50% by weight of synthetically prepared, air-oxidized paraffin (acid value 112), are esterified at 100° to 150° C. with 46 parts of tetrakis-O($\beta$-hydroxyethyl-oxymethyl)-dimethylbenzene and 16 parts of ethylene glycol in an electrically heated frit tube in the presence of 0.7 part of sulfuric acid of 20% strength, while introducing nitrogen until an acid value of 28 is attained.

There is obtained a light brown, finely crystalline wax having a flow point/drop point of 93/94° C., which is much superior to purely aliphatic ester waxes, above all on account of its excellent oil binding property and extraordinary hardness.

Example 3

552 parts of stearic acid and 186 parts of tetrakis-O($\beta$-hydroxyethyl-oxymethyl)-dimethylbenzene are esterified with the addition of 0.6 part of sulfuric acid of 20% strength, as described in Example 1.

There is obtained a light yellow, brittle wax having the following characteristic values: acid value 26, saponification value 174, flow point/drop point 47/48, which can chiefly be applied in the field of lubricating waxes.

Example 4

In an agitator vessel, 412 parts of bleached montan wax acid are heated to 100°–150° C. with 56 parts of tetramethyloldimethylbenzene, while adding 0.6 part of sulfuric acid of 20% strength and introducing nitrogen, until the acid value has decreased to 17.

There is obtained a yellow wax having a saponification value of 126 and a flow point/drop point of 78/79° C., possessing an especially good compatibility with paraffins and an excellent capacity for forming pastes, which can be worked up into wax pastes possessing excellent gloss-producing properties.

Example 5

280 parts of hexachlormethyl-benzene are melted with 1880 parts of montanic acid (acid number 137), obtained by bleaching deresinified crude montan wax with chromosulfuric acid, while adding 364 parts of sodium hydroxide of 50% strength, with quick agitation. The water is distilled off and the reaction product, after the reaction is complete, freed from the adhering sodium chloride by washing and filtration.

There is obtained a light brown, extraordinarily hard wax having the following characteristic values: acid value 38, saponification value 177 and flow point/drop point 78/79° C., hardness of flow 715 kg./cm.$^2$.

Example 6

272 parts of dichlormethyl-tetramethylbenzene are melted with 970 parts of montan wax acid, obtained from montan wax by bleaching with chromosulfuric acid, and mixed with 94 parts of finely pulverized sodium hydroxide, with agitation. After the reaction is complete, the sodium chloride formed is removed, as indicated in Example 5.

The wax obtained has the following characteristic values: acid value 34, saponification value 114, flow point/drop point 80/81° C., hardness of flow 625 kg./cm.$^2$.

Example 7

(a) By the esterification of 412 parts of montan wax acid, prepared as described in Examples 5 and 6, with 65 parts of tetrakis-O($\beta$-hydroxyethyl-oxymethyl)-dimethyl-benzene in the presence of 0.6 part of sulfuric acid of 20% strength according to the process described in Example 1, there is obtained a yellow, extraordinarily hard wax with an acid value of 50 and a flow point/drop point of 78/79° C., which has very good gloss-producing properties and a very good compatibility with paraffins.

(b) When esterifying this wax with 3.15% by weight of calcium oxide at 135° C., there is obtained a very hard wax having an acid value of 8, a saponification value of 104 and a flow point/drop point of 108/114° C., which likewise has a very good compatibility with paraffins and very good gloss-producing properties. The properties can further be modified by the addition of zinc montanates.

We claim:

1. A hard ester wax having an acid value of 17 to 50 and consisting essentially of an esterification product of (1) an aliphatic monocarboxylic acid containing at least 12 carbon atoms and (2) a compound of the formula

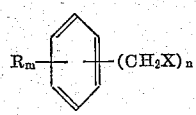

wherein X stands for a group formed by addition of up to 5 molecules of an alkylene oxide of 2 to 4 carbon atoms to a hydroxy group, R stands for an alkyl radical of up to 4 carbon atoms, and $n$ is at least 2, the sum of $n$ and $m$ being 6.

2. A hard ester wax having an acid value of 17 to 50 and consisting essentially of an esterification product of (1) an aliphatic monocarboxylic acid containing at least 12 carbon atoms and (2) a compound selected from the group consisting of tris-O-(β-hydroxyethyl-oxymethyl)trimethyl-benzene and tetrakis-O-(β-hydroxyethyl-oxymethyl)dimethyl-benzene.

3. A process for the manufacture of a hard ester wax having an acid value of 17 to 50, wherein a substantially monocarboxylic aliphatic acid containing not less than 12 carbon atoms is reacted with a compound of the formula

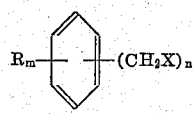

wherein X stands for a group formed by addition of up to 5 molecules of an alkylene oxide of 2 to 4 carbon atoms to a hydroxy group, R stands for an alkyl radical of up to 4 carbon atoms, and $n$ is at least 2, the sum of $n$ and $m$ being 6.

4. A process for the manufacture of a hard ester wax having an acid values of 17 to 50, wherein a substantially monocarboxylic aliphatic acid containing not less than 12 carbon atoms is reacted with a compound selected from the group consisting of tris-O-(β-hydroxyethyl-oxymethyl)trimethyl-benzene and tetrakis-O-(β-hydroxyethyl-oxymethyl)dimethyl-benzene.

5. The ester wax of claim 2, wherein the carboxylic acid is a mixture of acids obtained by chromic acid bleaching of a product selected from the group consisting of an air-oxidized paraffin hydrocarbon, montan wax and mixtures thereof.

6. The ester wax of claim 2, wherein there is added to the compound (2) up to 90% of at least one aliphatic polyol, calculated upon the total amount of said compound (2) and polyol.

7. The ester wax of claim 2, wherein there is added to the compound (2) up to 50% of at least one aliphatic polyol, calculated upon the total amount of said compound (2) and polyol.

8. The ester wax of claim 2, wherein a range of from about 0 to 50% of the free carboxylic acid groups present in the esterification product are neutralized to form a salt of at least one metal within the first and second main group of the periodic system.

References Cited in the file of this patent
UNITED STATES PATENTS

| | | |
|---|---|---|
| 2,331,169 | Bruson | Oct. 5, 1943 |
| 2,471,789 | Soday | May 31, 1949 |
| 2,480,347 | Wittcoff | Aug. 30, 1949 |
| 2,835,635 | Mayhew et al. | May 20, 1958 |
| 2,963,379 | Kaupp et al. | Dec. 6, 1960 |

OTHER REFERENCES

Webster's New International Dictionary, G. and C. Merriam Co., Publishers, Springfield, Massachusetts.